United States Patent [19]
Griffin et al.

[11] Patent Number: 6,000,660
[45] Date of Patent: Dec. 14, 1999

[54] ROTARY BEAM VARIABLE STIFFNESS WING SPAR

[75] Inventors: Kenneth E. Griffin, Boerne; Robert P. Guillot, Canyon Lake, both of Tex.; Damin J Siler, Wright Patterson AFB, Ohio

[73] Assignee: Southwest Research Institute, San Antonio, Tex.

[21] Appl. No.: 09/008,744

[22] Filed: Jan. 19, 1998

[51] Int. Cl.$^6$ ..................................................... B64C 1/00
[52] U.S. Cl. ..................................... 244/123; 244/117 R
[58] Field of Search ............................... 244/117 R, 119, 244/123

[56] References Cited

U.S. PATENT DOCUMENTS

| | | |
|---|---|---|
| 3,666,210 | 5/1972 | Look et al. . |
| 3,883,093 | 5/1975 | Violleau . |
| 4,330,100 | 5/1982 | Elber ............................................ 244/48 |
| 4,725,020 | 2/1988 | Whitener . |
| 4,863,117 | 9/1989 | Riout . |
| 5,082,207 | 1/1992 | Tulinius . |
| 5,150,864 | 9/1992 | Roglin et al. . |

*Primary Examiner*—Peter M. Poon
*Assistant Examiner*—Charles R. Ducker, Jr.
*Attorney, Agent, or Firm*—Jenkens & Gilchrist

[57] ABSTRACT

A segmented rotatable beam provides a spar or rib in an aircraft wing. The rotatable beam has a variable stiffness dependent upon the radial orientation of the rotatable beam about a longitudinal axis of the beam. The segmented rotatable beam comprises a plurality of tubular segments that are pivotly interconnected by connecting beam links that are rotatably mounted in bearings disposed along the longitudinal axis of the beam.

8 Claims, 5 Drawing Sheets

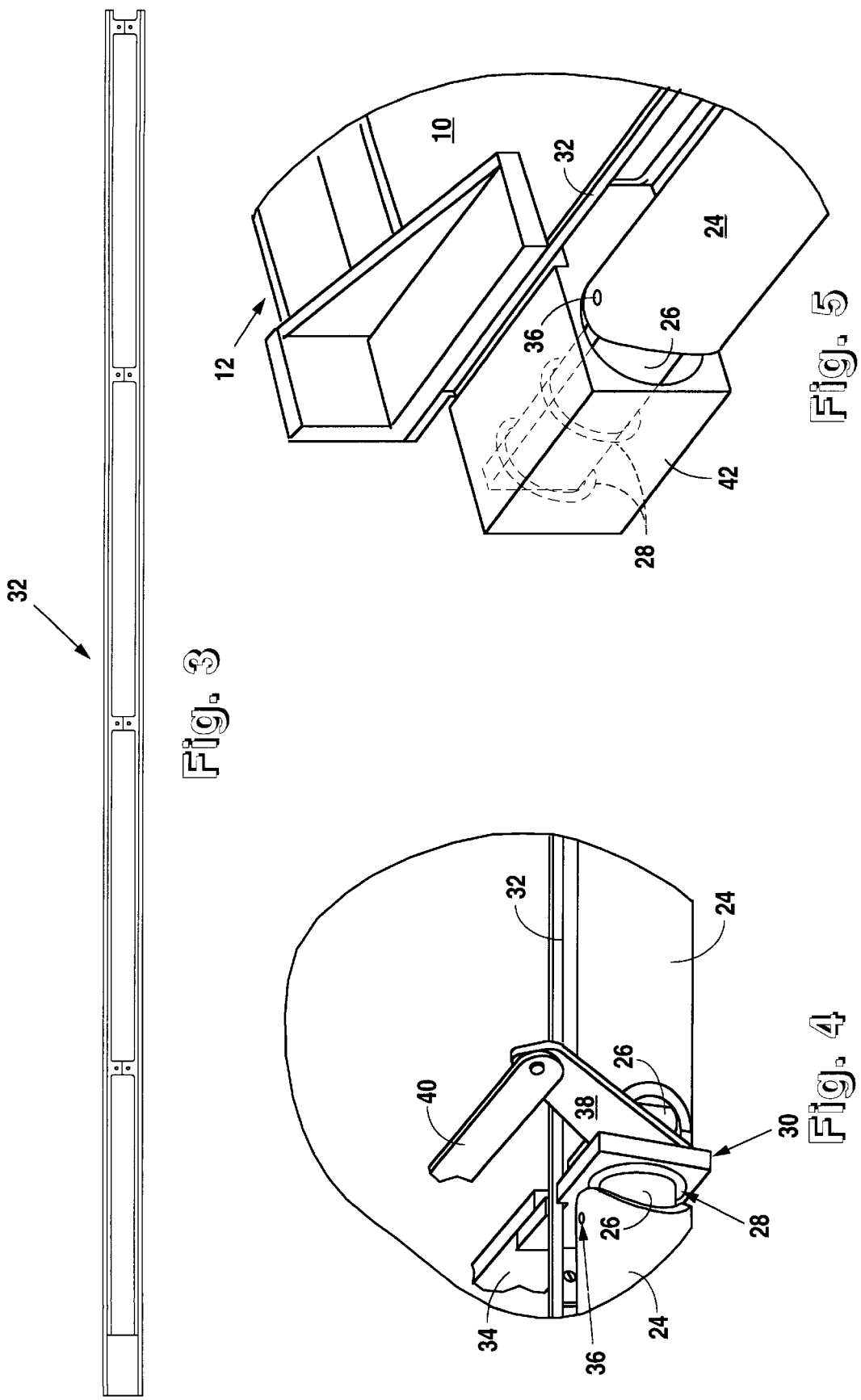

ROTARY BEAM VARIABLE STIFFNESS WING SPAR

GOVERNMENT LICENSE RIGHTS

The U.S. Government has a paid-up license in this invention and the right in certain circumstances to require the patent owner to license others on reasonable terms as provided for by the terms of Contract No. OLA95-5812-109-1 for the U.S. Air Force Wright Laboratory through Anteon Corporation.

BACKGROUND OF THE INVENTION

1. Technical Field

This invention relates generally to a variable stiffness structural member for use in the wing of an aircraft, and more particularly to a rotatable structural member that provides selectivity in the amount of strength and stiffness that the structural member contributes to the wing structure.

2. History of Related Art

An arrangement of spars, ribs, and wing skin typically provide the primary load-carrying structure of an aircraft wing. This assembled structure, called the wing structural box, provides the primary source of structural stiffness for modern, high-performance, monocoque wings. The wing structural box determines the load-carrying capability of the wing and the structural stiffness of the wing's aeroelasticity.

The aeroelasticity of a conventional wing with fixed stiffness dictates that as the wing speed increases, the aerodynamic moments of the wing air loads progressively become stronger and may reach a value that exceeds the torsional stiffness of the wing. Large aerodynamic moments become especially troublesome for wings that provide aircraft control functions by means of leading and/or trailing edge control surfaces, or flaps. High aerodynamic moments may cause a loss in the control forces that the flaps are able to provide to the aircraft if the aeroelastic losses become so great that control capability is compromised. The air speed at which this occurs is classically referred to as the aileron or control reversal air speed. If the air speed is increased past the reversal air speed, the force perturbations begin to return but are opposite in sign to those generated below the reversal air speed.

The aeroelastistic contributions to the loss of the control functions may be so severe that the utility of using wing-mounted ailerons is marginal for high performance transonic aircraft of any size. The control function is usually recovered by the use of a much less efficient all-movable horizontal tail surfaces. Aircraft designers would like to employ higher aspect ratio wing platforms for increased range or speed without the need for roll control from horizontal tails.

The present invention is directed to overcoming the problems described above. It is desirable to have a wing structural box in which the stiffness of the wing can be varied to turn the aeroelastistic control function loss into an aircraft control function asset. A variable stiffness wing permits the use of more efficient wing plan forms and the removal of horizontal tail control surfaces. Moreover, it is desirable to have at least one of the structural members, i.e., a spar or rib, that has selectively variable stiffness so that the amount of strength and stiffness that the spar or rib contributes to the wing structure can be modulated. It is also desirable to have a wing structural box in which the wing torsional stiffness can be varied with changes in air speed, so that in all speed ranges the wing ailerons produce the necessary control forces to properly maneuver the aircraft, with aircraft roll control being desirably provided by using only the wing-aileron surfaces.

SUMMARY OF THE INVENTION

In accordance with one aspect of the present invention, a wing for an airplane, in which the wing has a root end, a tip end, a leading edge, and a trailing edge, comprises a rotatable segmented beam disposed as the trailing edge spar of the wing. The rotatable segmented beam extends between the root end and the tip end of the wing, and has a maximum stiffness value when the beam is rotated to a first radial position about an axis parallel with the trailing edge of the wing, and a minimum stiffness value when rotated to a second radial position about the axis parallel with the trailing edge of the wing. The wing also includes a means for rotating the segmented beam between the first and second radial positions.

Other features of the wing include the rotatable segmented beam being rotatably supported on a carrier member disposed in parallel arrangement with the rotatable segmented beam. The root end of the wing has a root chord extending between the leading edge and the trailing edge of the wing, and the carrier member has a maximum stiffness value in a coplanar direction with a plane defined by the root chord and the trailing edge of the wing, and a minimum stiffness value in a direction normal to the plane defined by the root chord and the trailing edge of the wing.

Other features of the wing embodying the present invention include the rotatable segmented beam having a plurality of tubular segments disposed along the axis parallel with the trailing edge of the wing, with adjacently disposed segments being pivotally interconnected by a connecting beam link that is rotatably mounted in a bearing supported within a bracket attached to the carrier member. Still other features include the plurality of tubular segments having an external shape adapted to define the trailing edge of the wing.

In accordance with another aspect of the present invention, a variable stiffness wing spar for use in the wing structure of an airplane includes a segmented beam having a longitudinal axis extending along the length of the wing between the root end and the tip end of the wing. The segmented beam is rotatable about the longitudinal axis and has a maximum stiffness value when rotated to a first radial position about the longitudinal axis, and a minimum stiffness value when rotated to a second radial position about the longitudinal axis.

Other features of the variable stiffness wing spar embodying the present invention include the rotatable segmented beam being rotatably mounted on a carrier member disposed in parallel arrangement with the rotatable segmented beam. The carrier member has a maximum stiffness value in a coplanar direction with the planform of the wing, and a minimum stiffness value in a direction normal to the planform of the wing.

Still other features of the variable stiffness spar embodying the present invention include the rotatable segment beam having a plurality of tubular segments disposed along the longitudinal axis, with adjacently disposed segments being pivotally interconnected by a connecting beam link that is rotatably mounted on a bearing supported within a bracket attached to the carrier member.

BRIEF DESCRIPTION OF THE DRAWINGS

A more complete understanding of the structure and operation of the present invention may be had by reference to the following detailed description when taken in conjunction with the accompanying drawings, wherein:

FIG. 3 is an elevational view of a carrier member for the rotatable segmented beam, shown in FIG. 2;

FIG. 4 is a three-dimensional view of an interconnecting link arrangement between adjacent segments of the rotatable beam shown in FIG. 2;

FIG. 5 is a three-dimensional view of the mounting of the rotatable segmented beam to the carrier member at the root end of the beam;

DETAILED DESCRIPTION OF A PRESENTLY PREFERRED EXEMPLARY EMBODIMENT

Figure 1:
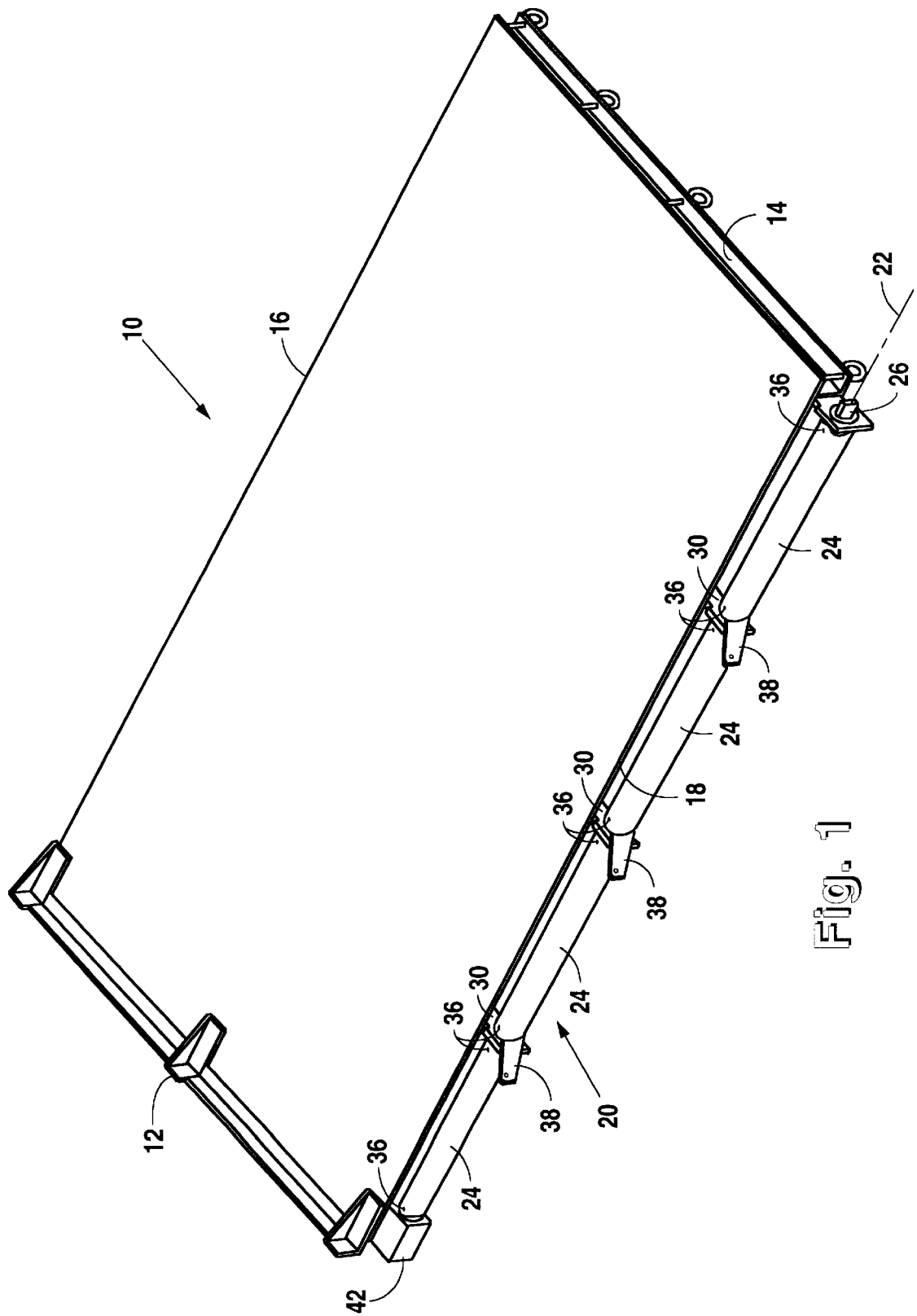
FIG. 1 is a three-dimensional view of a generic wing structural box, embodying the present invention.
Figure 2:
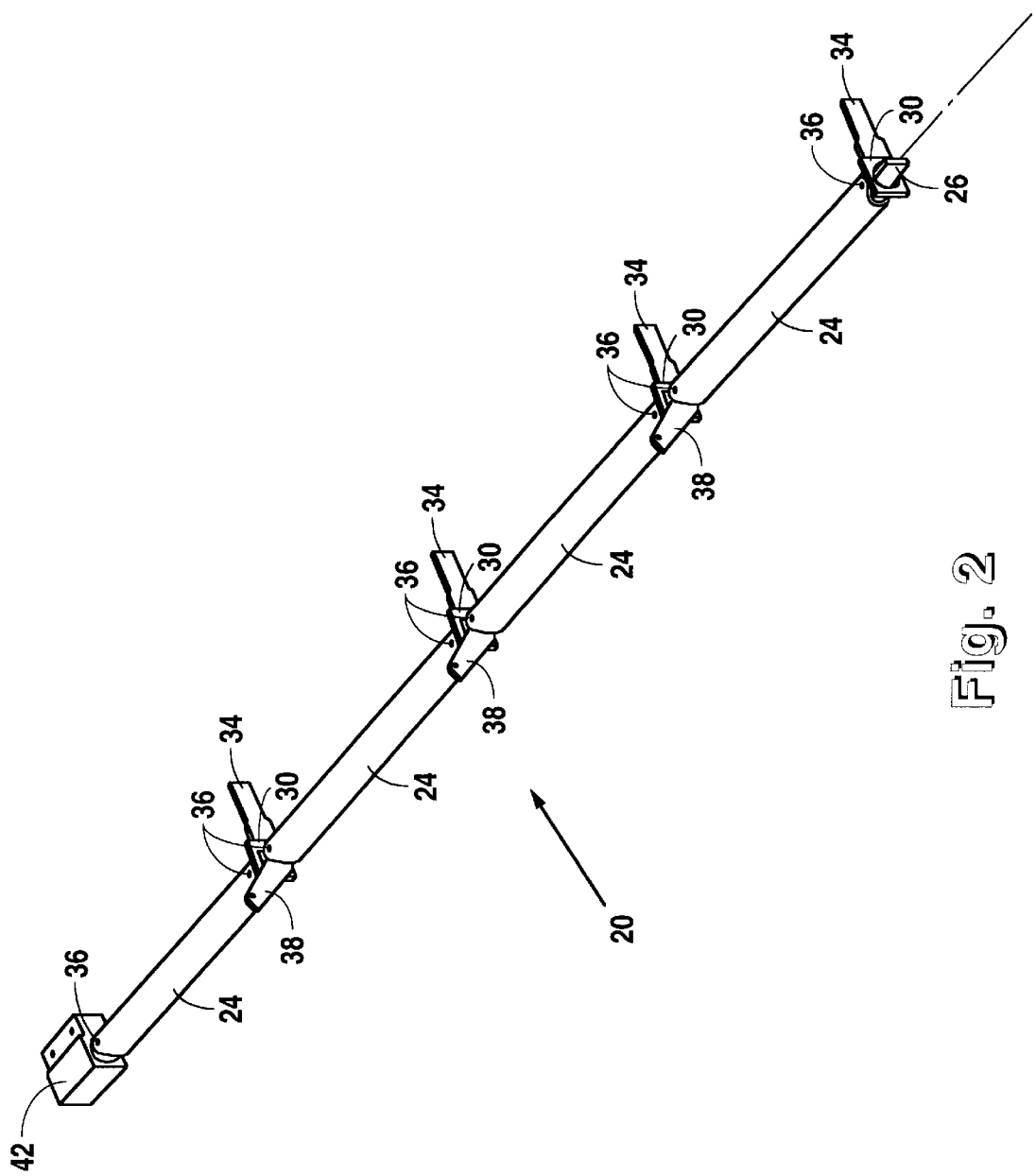
FIG. 2 is a three-dimensional view of a rotatable segmented beam, embodying the present invention, that, in the illustrated embodiment, is disposed along the trailing edge of the wing structural box shown in FIG. 1.

In the following detailed description of a structure for an aircraft wing embodying the present invention, a generic wing structural box 10 is shown in FIG. 1. The wing structural box 10 has a root end 12, a tip end 14, a leading edge 16, and a trailing edge 18. A rotatable segmented beam 20 embodying the variable stiffness spar structure of the present invention, is disposed along the trailing edge 18 of the wing structural box 10. The rotatable segmented beam 20 extends between the root end 12 and the tip end 14 of the wing structural box 10, and has a longitudinal axis 22 about which the rotatable segmented beam 20 rotates.

The rotatable segmented beam 20 includes a plurality of tubular segments 24 that are pivotally interconnected by a connecting beam link 26 extending between the ends of adjacently disposed ones of the tubular segments 24. As best shown in FIG. 4, each of the connecting beam links 26 is rotatably mounted in a bearing 28 that is supported in a bracket 30 attached to a streamline box rib 34.

In the preferred embodiment of the present invention, the carrier member 32, as best shown in elevation in FIG. 3, is a C-section channel beam, in which a major portion of the shear web between the top and bottom flanges has been removed. As described below in greater detail, the carrier member 32 is disposed in parallel arrangement with the rotatable segmented beam 20 with the top and bottom flanges of the carrier member 32 being parallel with a plane defined by the root chord, i.e. a line extending between the leading and trailing edges of the wing structural box at the root end 12 of the box 10, and the trailing edge 18 of the wing structural box 10. Thus, with a major portion of the shear web of the carrier member 32 removed, the carrier member 32 has a maximum stiffness value in a co-planar direction with the plane defined by the root chord and the trailing edge of the wing, and a minimum stiffness, i.e., freedom to bend, in a vertical direction normal to the plane defined by the root chord in the trailing edge of the wing. Desirably, the carrier member 32 is attached to the trailing edges of the wing ribs 34, and advantageously may replace a conventional trailing edge spar.

Turning again to FIG. 4, each end of adjacently disposed tubular segments 24 are connected to the connecting links 26 by a pair of pins 36. The segments 24 are relieved to provide clearance for movement of the segments 24 about the axis of the pins 36. This arrangement forms an articulated joint at each end of the bearing-mounted connecting links 26 that allow the segments 24 of the beam 20 to move, or resist the deflection, depending upon the rotational angle. When the connecting beam links 26 are oriented vertically, i.e., normal to the planform of the wing, the pins 36 are also oriented vertically and the segments 24 of the beam 20 are prevented from deflecting in the vertical direction. When rotated 90 degrees, to a horizontal orientation, i.e., coplanarly aligned with the planform of the wing, the connecting beam links 26 are aligned parallel to the planform and permit the segmented rotatable beam 20 to deflect vertically. At the horizontal position of the links 26, the beam 20 does not provide any stiffness to the wing structural box 10 in the vertical bending mode.

The connecting beam links 26 are mounted in the circular bearings 28 and permit the desired rotation of the beam 20 to provide either load-supporting capability of the trailing edge 18 of the wing, or the absence of any load-carrying capability along the trailing edge of the wing structural box 10.

Each of the connecting beam links 26, in the preferred embodiment, are connected to an actuator arm 38 that is pivotally connected to a connecting link 40 that is attached to an actuator (not shown). Desirably, the actuator is mounted on a selected structural member of the wing, such as a spar or rib, and may be either a conventional hydraulically or electrically driven linear or rotatory motion actuator. The desired rotation angle of the rotary beam can be maintained either by the external actuation arm 38, as shown in FIG. 4 for ground test purposes, or by bevel gears mounted on the carry-through connecting beam links 26 which may be actuated by rotary actuators mounted internally in the wing box, with the rotary axis oriented streamwise.

Thus, the variable stiffness, rotatable segmented beam 20 is a structural member of the wing structural box 10 and provides selectable values of strength and stiffness. In the preferred exemplary embodiment, the rotatable segmented beam 20 is disposed along the trailing edge 18 of the wing structural box. In other applications, the rotatable segmented beam 20 may be positioned at other locations, such as in lieu of a structural spar or rib in other locations of the wing structural box 10 to exploit selected aeroelastic responses of the wing for benefit to the aircraft maneuverability.

When described in more general terms, in which the rotatable segmented beam 20 may be positioned at other locations within the wing structural box 10, the variable stiffness rotary beam 20 consists of a carrier member 32 that has minimal stiffness in the vertical direction of movement of the wing structural box 10. Multiple segments 24 of the rotary beam 20 are connected to one another by short segments, or connecting beam links 26, of smaller but greater stiffness. When described in the more general sense, the connecting beam links 26 may be considered to be carry-through beams that are attached to the rotary beam segments 24 by means of hinges at their respective ends. The carry-through links 26 are supported in attachment brackets by relatively large circular bearings 28. In the illustrated embodiment, the attachment brackets 30 are secured to the trailing edge of the wing ribs 34, and provide the means of transmitting the loads and stiffness between the rotary beam 20 and the rest of the wing structural box structure 10. The respective diameter of the rotary beam segments 24, and the depth of the attachment brackets 30 are largely determined by the depth of the wing box structure 10 at the location in which the rotary beam 20 is mounted. The lengths of the beam segments 24 are defined by the rib spacing of the wing box structure 10. If the wing box structure 10 varies in thickness from the root end 12 to the tip end 14, due to wing taper, the variable stiffness rotary beam 20 may also be tapered to match the taper of the wing box structure 10.

The carrier member 32, as described above, is essentially a C-shaped channel beam having as much of the shear web removed as possible, with the exception of a small section of the web at the wing root end of the member 32, as shown in FIG. 3. Thus, the carrier member 32 permits stabilization of the trailing edge of the wing box structure 10 while removing the path for transmitting shear stresses between the upper and lower flanges of the channel beam 32. Additional small areas of the shear web are not removed to provide for attachment of the brackets 30 and attachment of the carrier member 32 to the respective ribs 34 of the wing box structure 10. The variable strength/stiffness beam 20 is mounted as described above in the carrier member 32. Also, as described above, the rotatable beam 20 is divided into a number of pivotally interconnected segments 24. Depending on the orientation of the pin connections, the rotary beam 20 does, or does not, add strength and/or stiffness to the wing structural box 10.

In the preferred exemplary embodiment, each end of the rotary beam 20 is anchored to the carrier member 32 in a different manner. As shown in FIG. 5, the root end of the rotary beam 20 is anchored such that the beam 20 can transmit a bending moment into the root 12 of the wing structural box 10. This is made possible by a double-bearing housing 42 at the beam root end 12. The double-bearing housing 42 is inserted inside the C-channel geometry of the carrier member 32, and has a circular cavity that accepts two press fit bearings 28. The root end of the innermost rotary beam segment 24 is attached by the pinned hinge connection to the root connecting beam link 26. The root connecting beam link 26 has sufficient length to span the distance between the two ring bearings 28 in the beam root housing 42. This arrangement makes it possible to transmit a bending moment from the root carry-through connecting beam link 26 to the housing 42. The moment is then transmitted to the wing root end 12, allowing wing bending moment transmission, determined by the rotary angle of the segments 24 and connecting beam lengths 26. Longitudinal slippage is allowed between the carry-through connecting beam lengths 26 and the ring bearings 28 to avoid the binding during structural box deformations.

Figure 6:
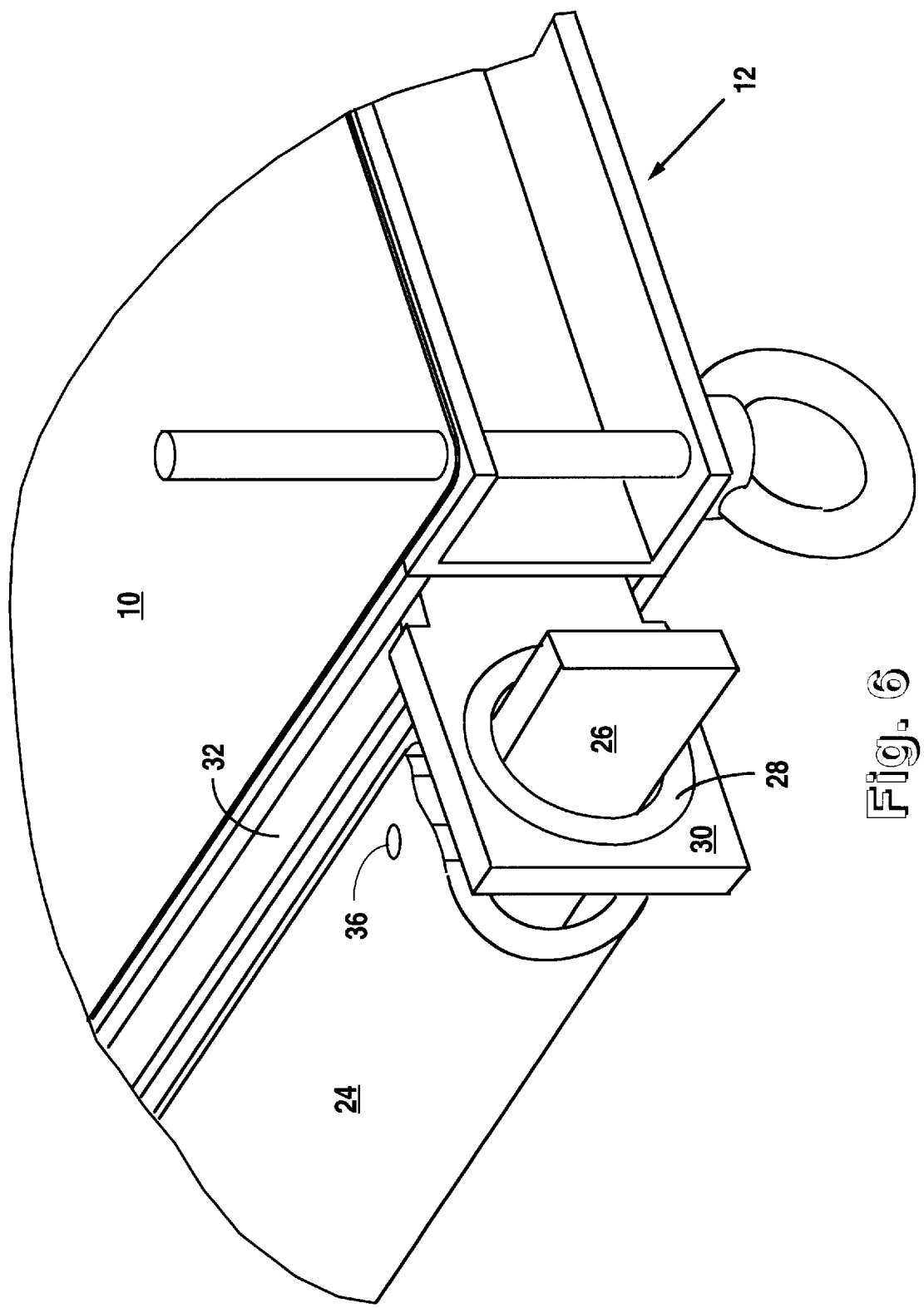
FIG. 6 is a three-dimensional view of the mounting of the rotatable segmented beam to the carrier member at the tip end of the beam.

The wing tip end 14 of the rotary beam 20 is anchored in a manner that transmits loads at a single point, and not transmit any bending moment. The attachment at the wing tip end is the same as the attachment at the intermediate mounting brackets for the interior, adjacently disposed, segments 24 of the beam 20. In the embodiment illustrated in FIG. 6, the only difference in the tip end mounting and the intermediate mounting positions is that there is no hinge pin at the outboard end of the carry-through connecting beam link 26. The single ring bearing 28 that permits beam link slip is the same as that for the inboard mounting bearings 28.

The rotatable segmented beam 20 may be considered as a variable stiffness spar for use in the wing structure of an airplane. Desirably, the variable stiffness spar is positioned such that the strength capabilities of the wing structural box 10 are not compromised. In the illustrated embodiment, the application of a variable stiffness beam 20 on the trailing edge spar station of a typical wing structural box 10 avoids creating strength problems in the wing structure, because the upstream spars of the wing have the primary function of carrying the wing generated air loads. The aft spar can be configured to be primarily responsible for wing torsional stiffness. Thus, the variation of the trailing edge spar stiffness can be advantageously used to safely vary wing stiffness without compromising the load-carrying capability of the wing. Desirably, the wing torsional stiffness can be continually optimized by adjusting the variable stiffness rotary aft spar 20 to keep the aileron reversal responses as far away from any desired operating speed as necessary. Thus, using the spar arrangement in accordance with the present invention alone could provide the necessary aircraft roll control without help from any other surfaces.

Figure 7:
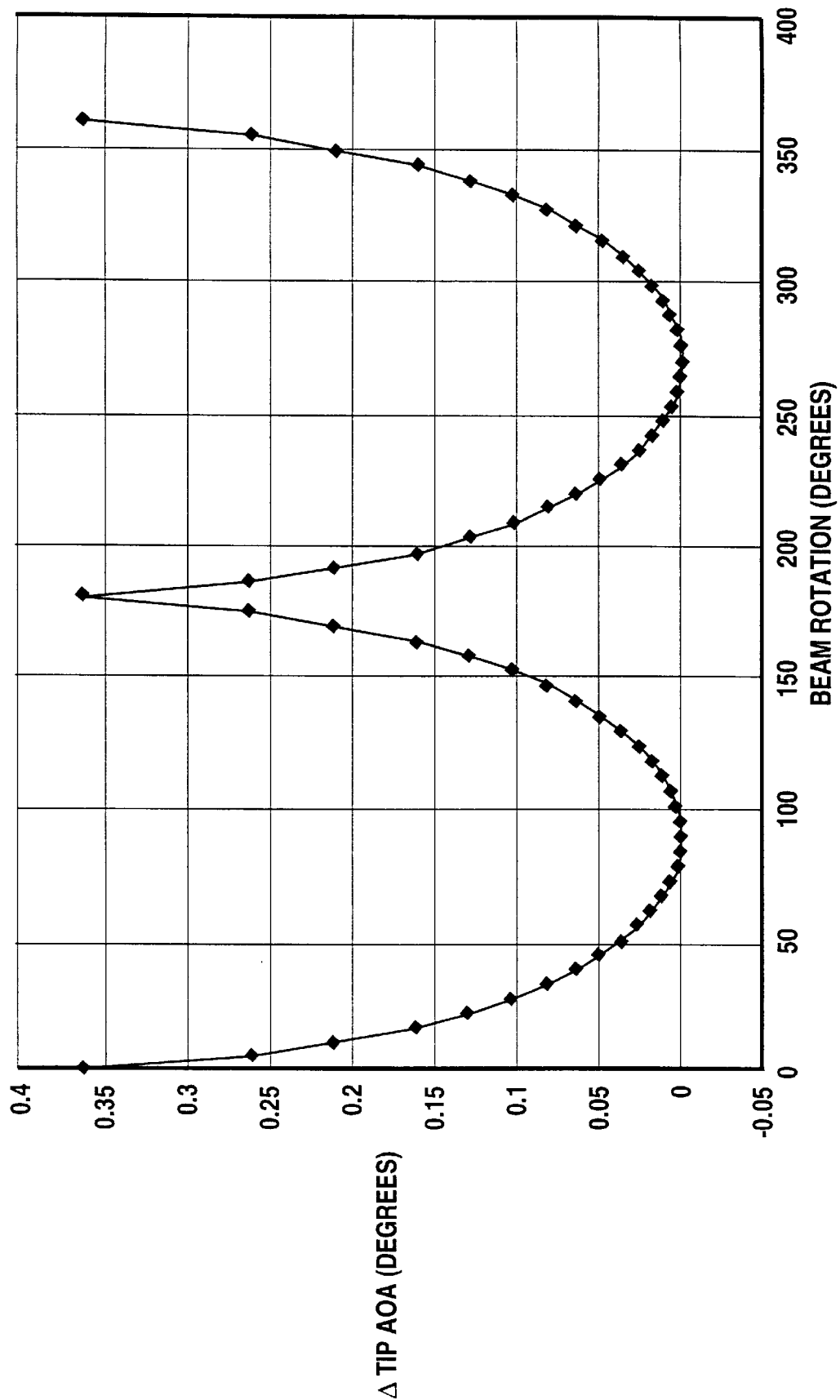
FIG. 7 is a graph showing the change in angle of attack of the wing, under load, at the tip end in response to rotating the segmented beam.

The rotational angle of the beam 20, whether constant or actuated in a prescribed time-dependent manner, controls the amount of strength and/or stiffness that the variable stiffness rotary beam 20 contributes to the wing box structure 10. In a test of the wing structural box 10, constructed in accordance with the above-described preferred exemplary embodiment, a 1,000 pound load was suspended from the trailing edge tip end 14 of the wing structural box 10. As the rotatable segmented beam 20 was rotated, deflection was measured at the trailing edge of the tip end 14 of the wing structural box 10. The deflection of the trailing edge at the tip end 14, caused a significant change in the tip angle of attack of the wing with respect to the free stream airflow. In actual practice, the rotatable beam would probably be only rotated through an angle of about 90 degrees. However, in the test arrangement, the rotary beam was rotated to an angle of 360 degrees, and the change in tip angle of attack was plotted as shown in FIG. 7. At 0 degrees, the pinned connections, i.e., the connecting beam links 26, are oriented horizontally with respect to the planform of the wing, and the rotatable segmented beam 20 offers the least resistance to bending. The deflection of the trailing edge of the wing resulted in approximately a 0.36 degree change in the angle of attack with respect to the deflection noted when the beam was rotated 90 degrees at which the connected beam links 26 were oriented vertically and the rotatable segmented beam 20 exhibited a maximum stiffness value. Substantially the same deflections were noted when the beam rotation was continued to 180 degrees, whereat an approximate 0.36 change in the tip angle of attack was noted, then to 270 degrees whereat the beam had maximum stiffness, and then around to 360 degrees or at the starting 0 degree position, whereat the beam had least resistance to bending. In the presence of aeroelastic air loads, instead of the point loading applied to the test structure as described above, much larger changes in the angle of attack are expected.

Although the present invention is described in terms of a preferred exemplary embodiment, with specific illustrative key constructions and shapes, those skilled in the art will recognize the changes in the shape of the segments 24 of the rotatable beam 20, in the articulated connection between segments, and in the location of the rotatable beam structure 20 within the wing, may be made without departing from the spirit of the invention. Such changes are intended to fall within the scope of the following claims. Other aspects, features, and advantages of the present invention may be obtained from a study of this disclosure and the drawings, along with the appended claims.

What we claim is:

1. A wing for an airplane, said wing having a root end, a tip end, a leading edge, and a trailing edge, and comprising;
   a rotatable segmented beam providing the trailing edge spar of the wing and extending between the root end and the tip end of said wing, said segmented beam having a maximum stiffness value when rotated to a first radial position about an axis parallel with said trailing edge of the wing, and a minimum stiffness value when rotated to a second radial position about the axis parallel with said trailing edge of the wing; and a means for rotating said segmented beam between said first and said second radial positions.

2. A wing as set forth in claim 1, wherein said root end of said wing has a root chord extending between the leading edge and the trailing edge of said wing, and said rotatable segmented beam is rotatably supported on a carrier member disposed in parallel arrangement with said rotatable segmented beam and having a maximum stiffness value in a coplanar direction with a plane defined by said root chord and said trailing edge of the wing, and a minimum stiffness value in a direction normal to said plane defined by the root chord and the trailing edge of said wing.

3. A wing, as set forth in claim 2, wherein said wing includes a plurality of ribs and said rotatable segmented beam comprises a plurality of tubular segments disposed along said axis parallel with the trailing edge of said wing, with adjacently disposed segments being pivotally interconnected by a connecting beam link that is rotatably mounted in a bearing supported within a bracket attached to one of said ribs.

4. A wing, as set forth in claim 3, wherein said plurality of tubular segments have an external shape adapted to define the trailing edge of said wing.

5. A wing, as set forth in claim 3, wherein said means for rotating said segmented beam between said first and said second radial positions includes an actuator arm connected to at least one of said connecting beam links, said actuator arm being movable by an actuator mounted on a predefined structural member of said wing.

6. A variable stiffness spar for use in the wing structure of an airplane, said wing having a root end, a tip end, and a predefined plan form, said spar comprising;

a segmented beam having a longitudinal axis extending along the length of said wing between said root end and said tip end and being rotatable about said longitudinal axis, said segmented beam having a maximum stiffness value when rotated to a first radial position about said longitudinal axis, and a minimum stiffness value when rotated to a second radial position about the longitudinal axis.

7. A variable stiffness spar, as set forth in claim 6, wherein said rotatable segmented beam is rotatably supported on a carrier member disposed in parallel arrangement with said rotatable segmented beam and having a maximum stiffness value in a coplanar direction with a plan form of the wing, and a minimum stiffness value in a direction normal to said plan form of the wing.

8. A variable stiffness spar, as set forth in claim 7, wherein said rotatable segmented beam comprises a plurality of tubular segments disposed along said longitudinal axis with adjacently disposed segments being pivotally interconnected by a connecting beam link that is rotatably mounted in a bearing supported within a bracket attached to a rib of said wing structure.

* * * * *